US012705271B1

(12) United States Patent
Hailpern et al.

(10) Patent No.: US 12,705,271 B1
(45) Date of Patent: Aug. 11, 2026

(54) CONTEXT-BASED PROMPT GENERATION

(71) Applicant: Adobe Inc., San Jose, CA (US)

(72) Inventors: Joshua Michael Hailpern, San Jose, CA (US); Ross Richard Pfahler, Los Gatos, CA (US); Phoebe Alexandra Carias Atkins, Midlothian, VA (US); Michael Connor Dwyer, Poughkeepsie, NY (US); Loic Feujio, Upper Marlboro, MD (US); Keith Marcel Buchanan, Orleans (CA); Claudia Wai Yu, San Mateo, CA (US)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 19/074,390

(22) Filed: Mar. 9, 2025

(51) Int. Cl.

| | |
|---|---|
| ***G06F 3/04842*** | (2022.01) |
| ***G06F 16/332*** | (2025.01) |
| ***G06F 16/338*** | (2019.01) |
| ***G06F 16/38*** | (2019.01) |
| ***G06F 16/958*** | (2019.01) |

(52) U.S. Cl.
CPC ........ *G06F 16/338* (2019.01); *G06F 3/04842* (2013.01); *G06F 16/3325* (2019.01); *G06F 16/38* (2019.01); *G06F 16/986* (2019.01)

(58) Field of Classification Search
CPC .... G06F 16/338; G06F 16/3325; G06F 16/38; G06F 16/986; G06F 3/04842
See application file for complete search history.

(56) References Cited

U.S. PATENT DOCUMENTS

| | | | | |
|---|---|---|---|---|
| 11,962,546 | B1 * | 4/2024 | Hattangady | G06N 3/0475 |
| 2025/0005050 | A1 * | 1/2025 | Krishnan | G06F 16/243 |
| 2025/0028745 | A1 * | 1/2025 | Chen | G06F 16/338 |
| 2025/0245872 | A1 * | 7/2025 | Cokely | G06F 16/58 |
| 2025/0258874 | A1 * | 8/2025 | Ahmadia | G06F 16/93 |
| 2025/0284725 | A1 * | 9/2025 | Cantrell | G06F 40/279 |
| 2025/0298883 | A1 * | 9/2025 | Mehtani | G06F 3/04842 |
| 2025/0322475 | A1 * | 10/2025 | Jain | H04L 67/535 |

* cited by examiner

*Primary Examiner* — Kris E Mackes
(74) *Attorney, Agent, or Firm* — FIG. 1 Patents

(57) ABSTRACT

Context-based prompt generation techniques for generative machine-learning models are described. In one or more examples, a user interface (UI) selection of a UI element of first digital content is received. A processing device captures contextual information associated with the UI selection. A machine-learning model generates a prompt based on the UI selection and the contextual information. Generative artificial intelligence (AI) generates second digital content based on the prompt. The generative AI is implemented using one or more machine-learning models. The processing device then presents the second digital content for display in a user interface.

20 Claims, 10 Drawing Sheets

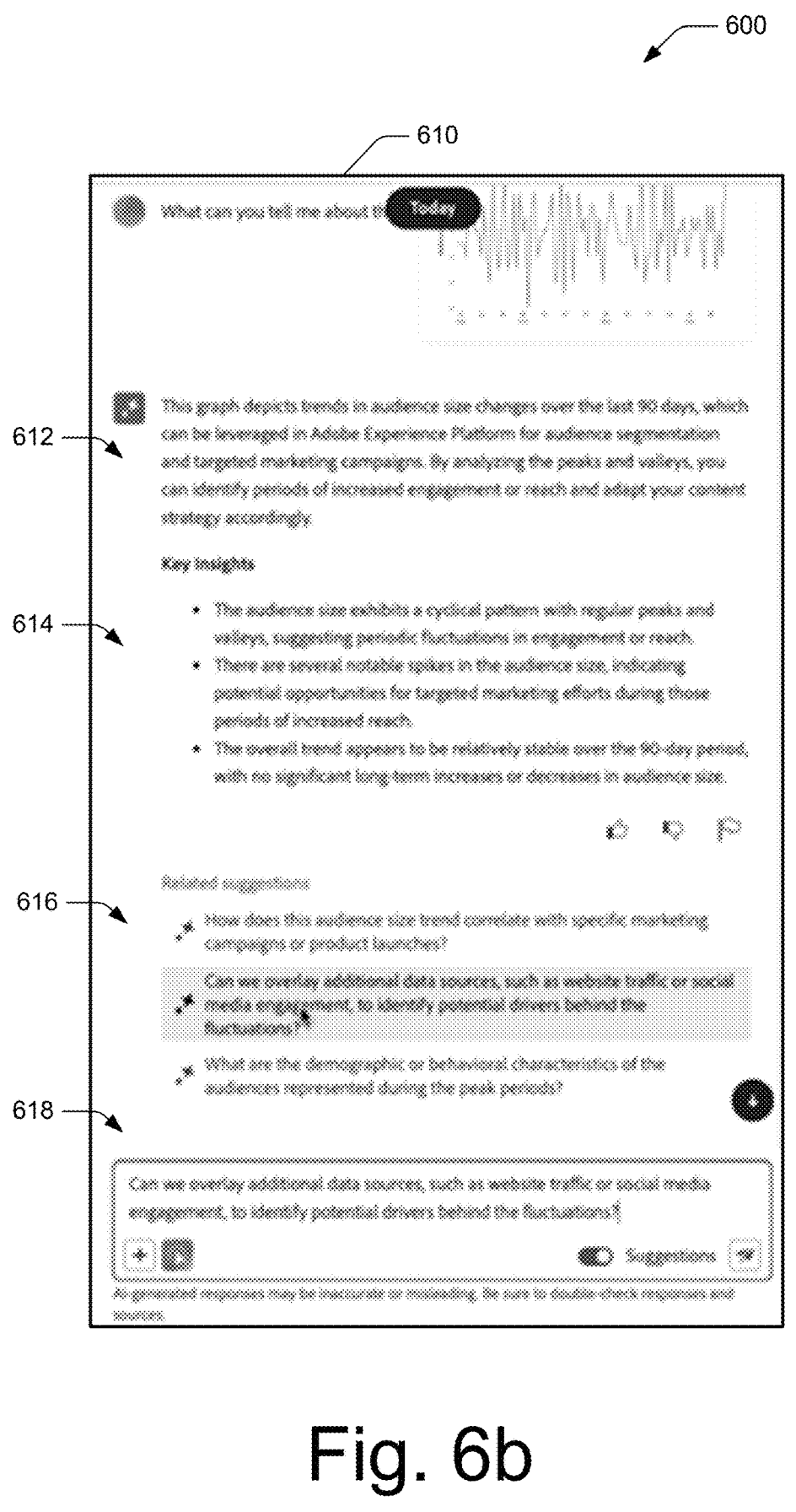

600

610

What can you tell me about th

Today

612

This graph depicts trends in audience size changes over the last 90 days, which can be leveraged in Adobe Experience Platform for audience segmentation and targeted marketing campaigns. By analyzing the peaks and valleys, you can identify periods of increased engagement or reach and adapt your content strategy accordingly.

Key Insights

614

- The audience size exhibits a cyclical pattern with regular peaks and valleys, suggesting periodic fluctuations in engagement or reach.
- There are several notable spikes in the audience size, indicating potential opportunities for targeted marketing efforts during those periods of increased reach.
- The overall trend appears to be relatively stable over the 90-day period, with no significant long-term increases or decreases in audience size.

616

Related suggestions

How does this audience size trend correlate with specific marketing campaigns or product launches?

Can we overlay additional data sources, such as website traffic or social media engagement, to identify potential drivers behind the fluctuations?

What are the demographic or behavioral characteristics of the audiences represented during the peak periods?

618

Can we overlay additional data sources, such as website traffic or social media engagement, to identify potential drivers behind the fluctuations?

Suggestions

AI-generated responses may be inaccurate or misleading. Be sure to double-check responses and sources.

Fig. 6b

CONTEXT-BASED PROMPT GENERATION

BACKGROUND

Artificial intelligence (AI) assistants utilize machine-learning models to generate content based on user inputs. The machine-learning models often employ large language or diffusion models trained on extensive datasets to understand and respond to prompts. When a query or request is presented, AI assistants analyze the input, draw relevant information from their training, and produce tailored responses or outputs. However, conventional AI assistants typically rely on users to understand the underlying problem, formulate precise queries, and provide sufficient context to achieve useful results.

SUMMARY

Context-based prompt generation techniques for generative machine-learning models are described. In one or more examples, an AI assistant selection system transforms the selection of user interface (UI) elements into implicit prompts for machine-learning analysis. The selection system receives a selection of one or more UI elements and captures contextual information associated with the selection. In one implementation, the selection includes both the image of the rendered screen and the underlying structure or content of the document object model (DOM). A prompt generation system then constructs a prompt using a machine-learning model based on the UI selection and contextual information. The prompt is provided to generative AI implemented using one or more machine-learning models to produce digital content, which is presented for display in the user interface.

This context-based prompt generation allows users to forego the formulation of express queries. Instead, selecting UI elements is interpreted as an implicit request for analysis and insight. The system automatically captures the selected digital content and related contextual information, allowing the AI assistant to provide immediate, contextually-aware assistance without waiting for the user to formulate explicit questions or instructions.

The contextual information captured includes analysis of the (complete) DOM structure, metadata associated with the selection, user interaction history, temporal data, device characteristics, user profile information (e.g., role, past queries, etc.), and environmental data. The collected context enables the generative AI to provide accurate and relevant responses. For example, the generative AI outputs explanatory information, suggested actions, relevant data or statistics, visual representations, and interactive elements that allow further exploration of the selected UI element. The generative AI can also suggest which steps or actions the user may have permission to access or if they need to reach out to others to support them.

In addition to simplifying user interaction with generative AI assistants, the described techniques improve the accuracy and relevance of AI assistance by capturing precise context directly from the user's point of focus. In this way, user interactions with AI assistants shift from "select-then-ask" to "selection-is-asking."

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRA WINGS

The detailed description is described with reference to the accompanying figures. Entities represented in the figures are indicative of one or more entities and thus reference is made interchangeably to single or plural forms of the entities in the discussion.

Figure 6A:
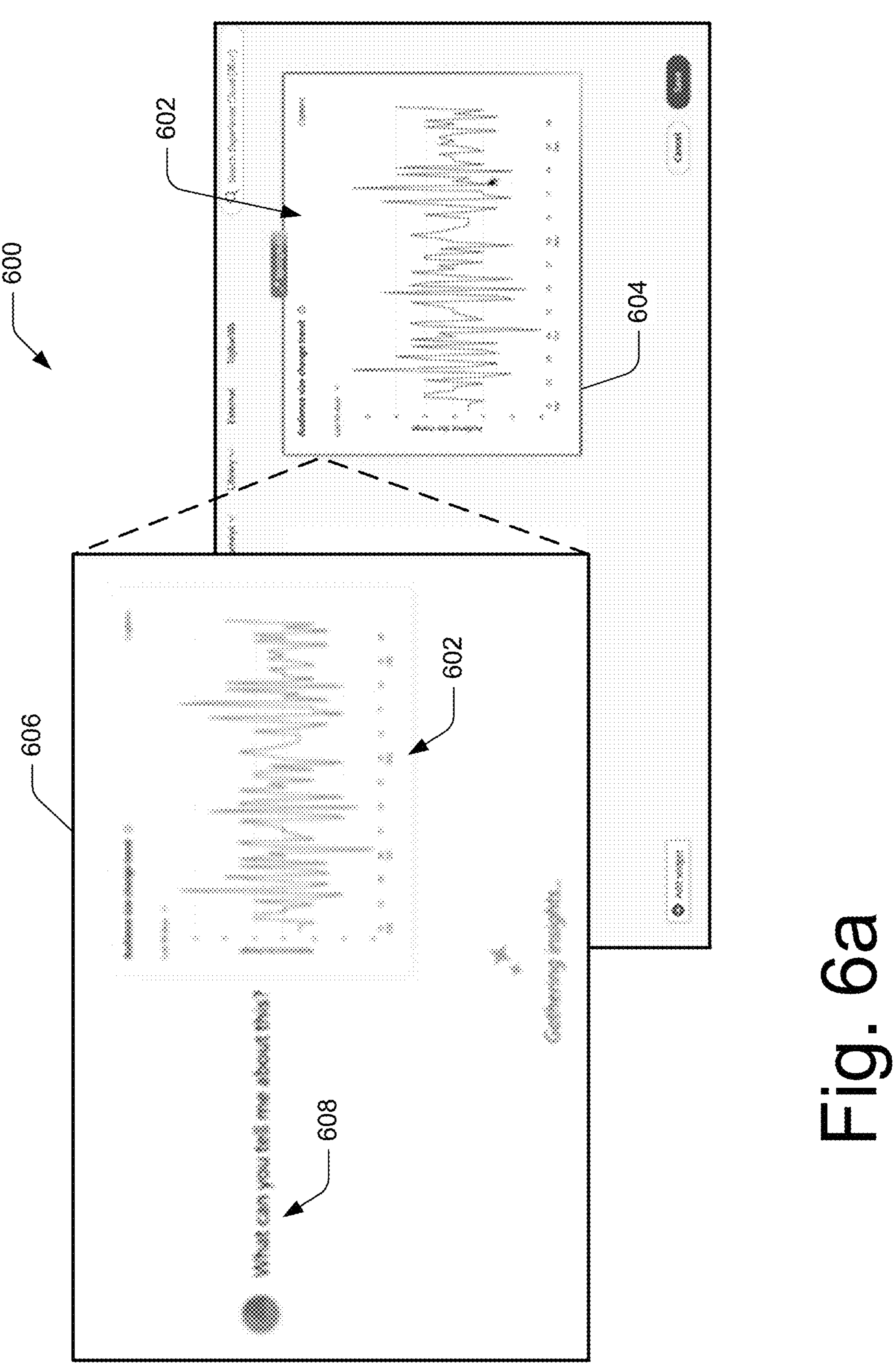

FIGS. 6*a* and 6*b* illustrate an example of context-based prompt generation and digital content presentation.

Figure 7:
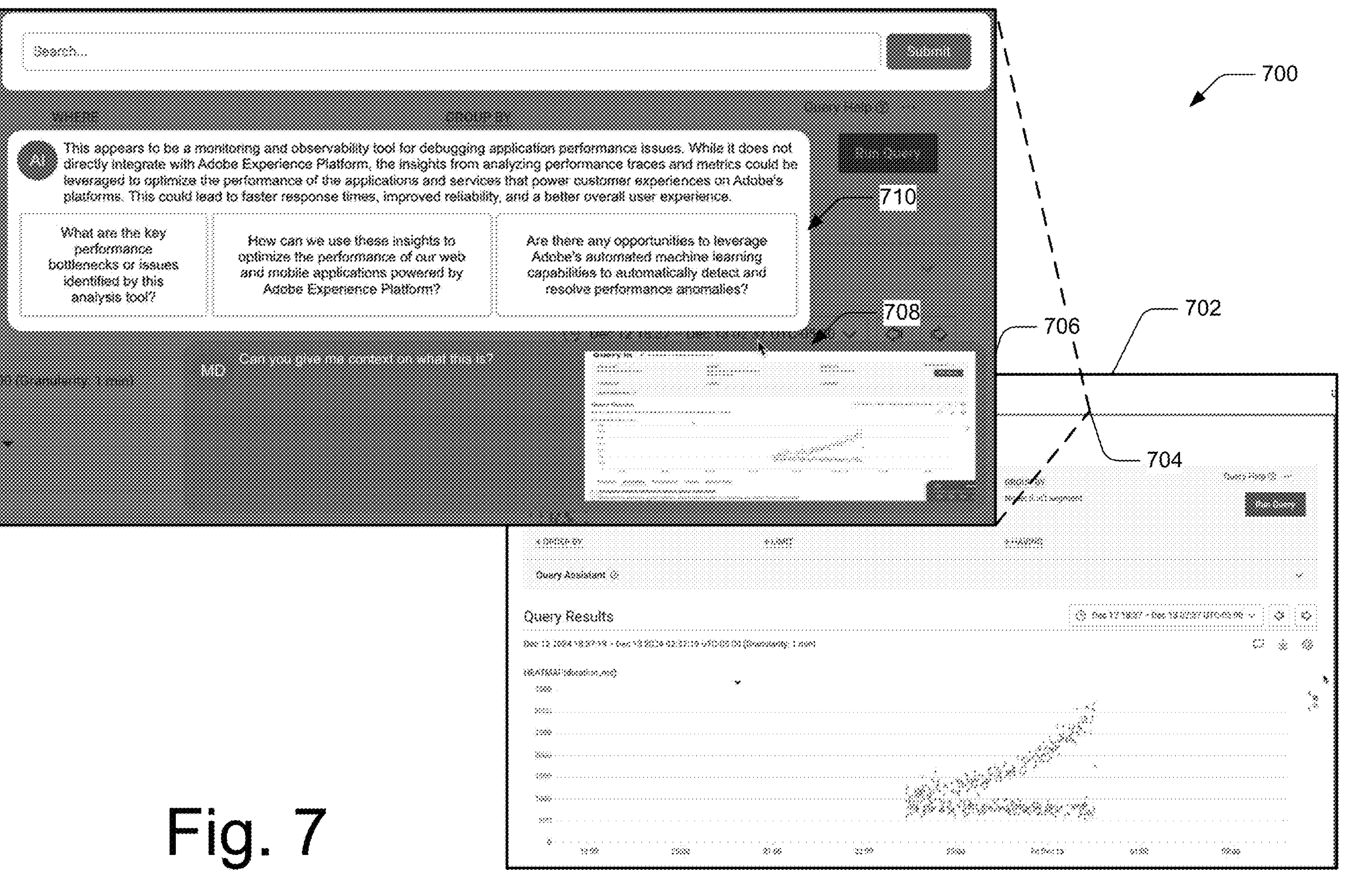

FIG. 7 illustrates an example of a webpage interaction utilizing the described context-based prompt generation techniques.

Figure 8:
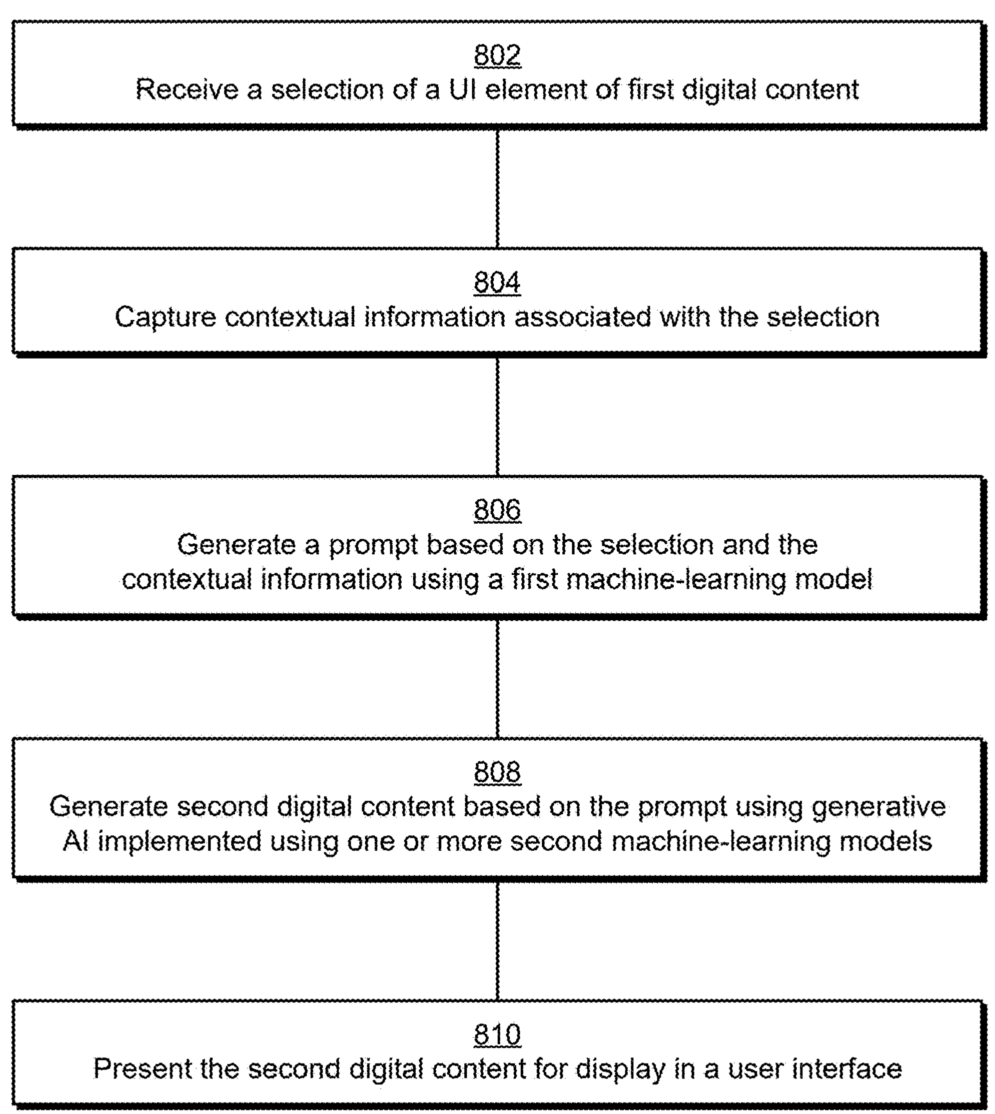

FIG. 8 is a flow diagram depicting an algorithm as a step-by-step procedure in an example implementation of operations performable for context-based prompt generation.

Figure 9:
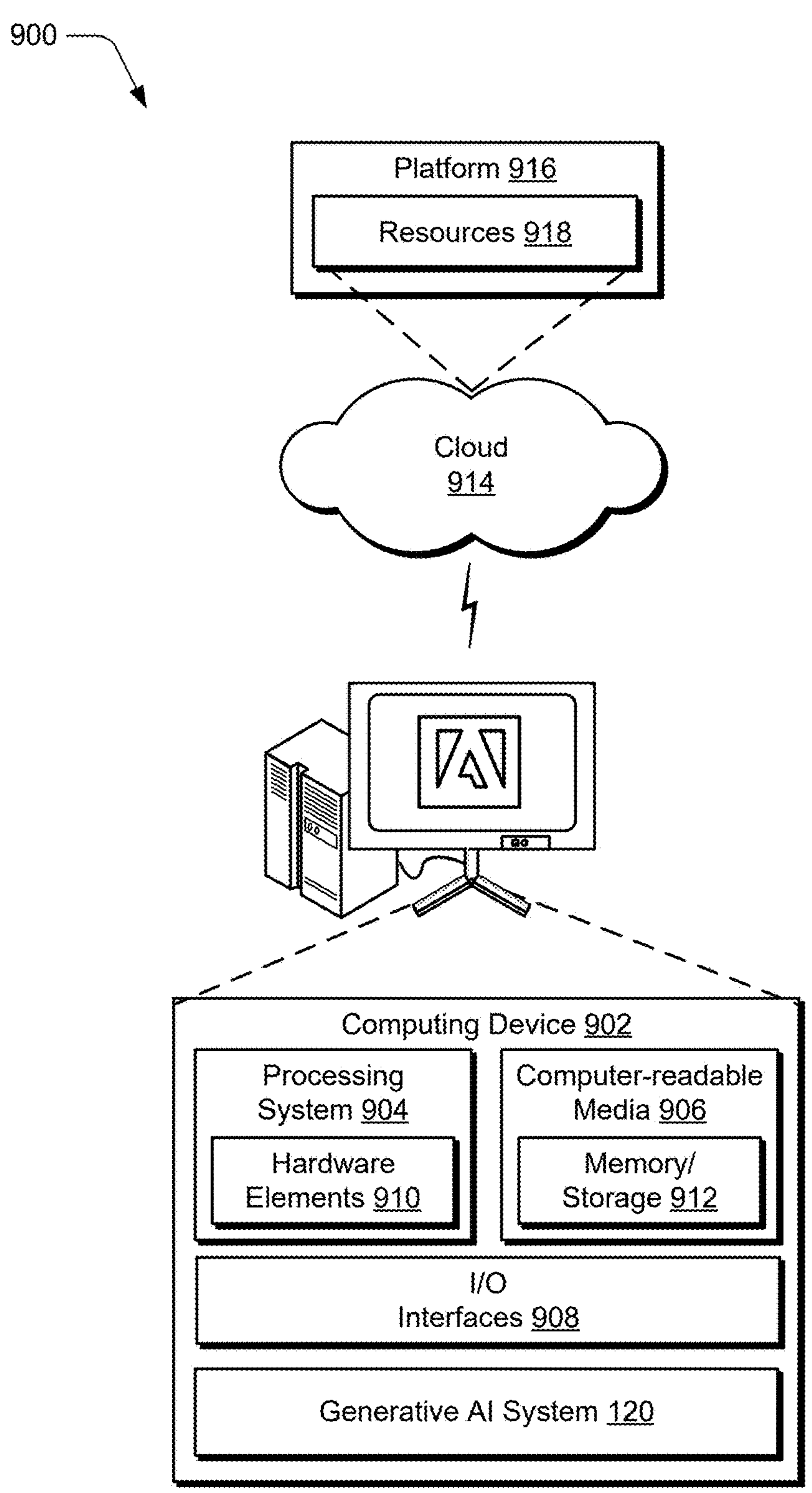

FIG. 9 illustrates an example system that includes an example computing device that is representative of one or more computing systems and/or devices that implement the various techniques described herein.

DETAILED DESCRIPTION

Overview

Techniques for context-based prompt generation are described that reimagine the interaction model between users and AI assistants and systems powered by AI. The selection of UI elements is transformed into prompts for AI analysis to improve the user experience and conserve device resources.

AI assistants have become increasingly prevalent in computer and digital applications. These AI assistants support a variety of functionalities by leveraging machine-learning models (e.g., large language models (LLMs) and diffusion models) to generate digital content based on user inputs. Various types of digital content may be generated, including digital images, audio, videos, text, and executable code. AI assistants draw relevant information from their training data and output tailored responses by analyzing user prompts and inputs (e.g., text, images, videos).

However, conventional AI assistants often require users to understand their challenges sufficiently to formulate precise queries that the system can understand and provide adequate context to obtain useful results. These assistants are often integrated into separate interfaces, forcing users to context switch between applications or interfaces. These aspects of conventional AI assistants result in inefficient utilization as users attempt to articulate and refine their prompts, clarify their intent, and mitigate context switching between their primary focus and the AI assistant or AI-powered solution. Furthermore, users may struggle to leverage AI capabilities effectively when unsure what capabilities are available, what questions to ask, or how to frame their inquiries.

For example, conventional AI assistants often include chat-based interfaces where users type out their questions or requests. Prompt generation creates a cognitive burden on users when translating their curiosity or confusion into specific queries. Additionally, these conventional systems frequently lack awareness of the user's current context within an application or interface, expecting users to provide relevant contextual details manually. Some conventional interface designs partially address the selection aspect of user interaction by allowing users to highlight or select specific elements for modification or supplement their query with images or files. However, these conventional tools still require an explicit follow-up action or prompt from the user, whether through typing a text prompt, selecting from a predefined menu of operations, or clicking specific operation buttons.

To address these and other technical challenges, techniques for context-based prompt generation are described. The selection of UI elements is converted into an implicit prompt for AI analysis. In at least one implementation, when a user selects an interface element (e.g., a chart they do not understand, a form they are unsure how to fill out, a UI element that they are unsure how it works, or a portion of digital content to analyze), the system interprets that selection as a request for AI analysis and insights. No additional prompt is requested from the user.

The system automatically captures the selected content (e.g., a chart, form, text, or UI control element) and relevant contextual information, allowing the AI assistant to provide contextually-aware assistance without the user being requested to formulate explicit questions or commands. In this way, the selection itself is treated as the user's "question." The AI provides analysis and insights and suggests additional analysis based on the UI selection, optionally augmented by additional context like page location, user journey, or related data.

In one implementation, a selection system captures and processes user interactions with the user interface. When a user selects a UI element, the system initiates a data collection process. This process involves analyzing the DOM structure, which provides insights into the hierarchical relationships between and properties of UI elements. The selection system also gathers metadata associated with the selection to offer additional context.

To further enrich the contextual information, the selection system collects user interaction history, including previous selections, interactions with similar elements, company roles, application permissions, or behavior patterns within the application. Temporal data is also captured, providing timestamps or duration information related to the selection. Device characteristics, such as screen size, resolution, or input method, are considered to account for potential variations in user experience across different platforms.

The contextual information is then processed by a prompt generation system, which includes a machine-learning model specifically trained to interpret the UI selection and associated contextual data to generate prompts for generative AI models. A machine-learning model analyzes the collected information, identifying patterns, relationships, and relevant features that inform the generation of an appropriate prompt. The prompt is a structured query that encapsulates the user's implicit request for information or assistance based on the UI selection. For example, the prompt guides generative AI in producing relevant and contextually appropriate digital content. The contextual information provided by the selection system enables the prompt generation system to create more nuanced and targeted prompts, which in turn lead to improved AI responses.

The prompt is then passed to the generative AI system, which is implemented using one or more machine-learning models. The models are designed to process the prompt and synthesize new digital content that aligns with the user's implicit request. The generative AI system interprets the parameters and context in the prompt to produce content that includes explanations, analyses, suggestions, or visual representations related to the selected UI element.

Finally, the generated digital content is displayed in the user interface. In one implementation, the presentation is designed to seamlessly integrate the AI-generated content into the existing interface, providing users with immediate, contextually relevant information or assistance based on the UI selection. This approach eliminates the formulation of explicit queries or switches between different interfaces, streamlining the process of obtaining AI-generated insights and assistance.

The described AI assistant also includes an adaptive learning component that monitors selection patterns and user feedback to improve prediction accuracy over time. Domain-specific AI models are leveraged based on the identified context to provide context-relevant generated content. By capturing precise context directly from the user's point of focus, the described techniques improve the accuracy and relevance of AI assistance while simplifying user interaction with generative AI assistants.

Term Examples

A "machine-learning model" refers to a computer representation that can be tuned (e.g., trained and retrained) based on inputs to approximate unknown functions. In particular, the term machine-learning model can include a model, including an AI model, a deep learning model, and similar variants, that utilizes algorithms to learn from and make predictions on known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

A "large language model" (LLM) is a machine-learning model designed to understand, generate, and interact with human language inputs at a large scale. These machine-learning models are trained on vast amounts of text data using deep learning techniques (e.g., neural networks) to learn patterns, nuances, and language structure. The use of the term "large" refers to both the size of the training data and also to the complexity and scale of the neural networks, which may include billions or even trillions of parameters.

Large language models are configurable to perform a wide range of language-related tasks without being explicitly programmed for each one. These tasks include text generation, translation, summarization, question answering, sentiment analysis, and natural language processing. To train a large language model, the underlying machine-learning model is provided with training data that includes examples of text to train and retrain the model to predict the next word in a sequence. Over time, the model, once trained, is configured to generate text that is coherent and contextually relevant, is configurable to mimic the style and content of the training data, and so forth. In this way, large language models provide a foundational tool in artificial intelligence for understanding and generating human language, powering various applications from conversational agents to content-creation tools.

A "diffusion model" is a generative machine-learning model for digital content creation, e.g., digital images. To train a diffusion model, noise is added to training data samples until the data within the training data samples is obscured. The diffusion model is then trained to reverse this process based on training data with a text prompt describing the digital content to be created to generate data samples as the digital content corresponding to the text prompt.

A "UI element" is a graphical user interface component that enables user interaction with digital content or software applications. UI elements include but are not limited to buttons, text fields, dropdown menus, checkboxes, sliders, icons, images, charts, forms, or any other interactive or displayable objects within a user interface. Users can select, manipulate, or interact with these elements to perform actions, input data, or access information within a digital environment.

"Contextual information" refers to data associated with a UI selection that provides additional insights about the selection, the user's environment, and the broader interaction context. This includes, for example, information derived from the document object model (DOM) structure, metadata related to the selected element, user interaction history, temporal data, device characteristics, and environmental factors. Contextual information enhances the understanding of the user's implicit request.

The following discussion describes an example environment that employs the techniques described herein. Example procedures that are performable in the example environment and other environments are also described. Consequently, the performance of the example procedures is not limited to the example environment, and the example environment is not limited to the performance of the example procedures.

Example Context-Based Prompt Generation Environment

Figure 1:
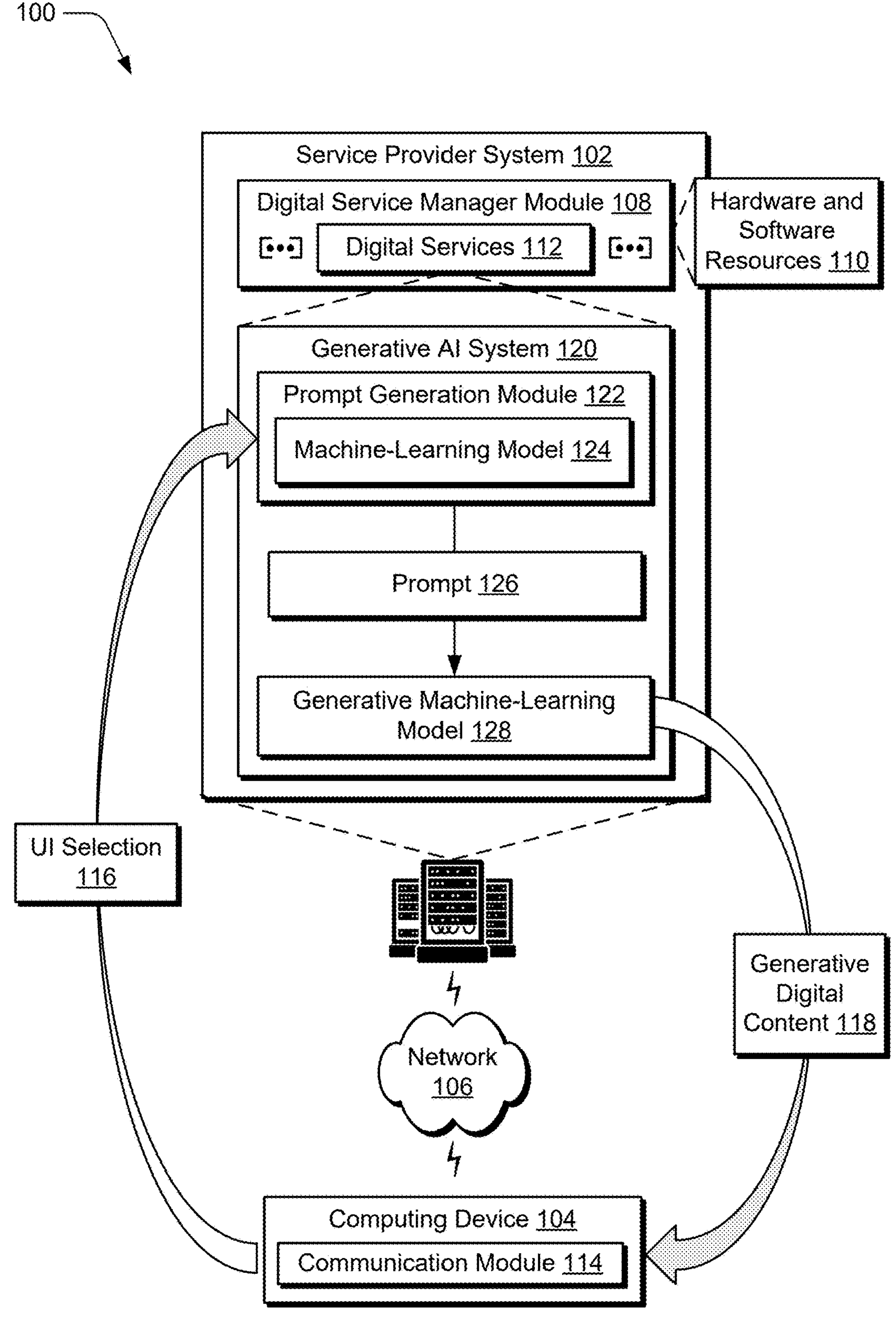
FIG. 1 illustrates a digital medium environment in an example implementation that is operable to employ context-based prompt generation techniques described herein.

FIG. 1 illustrates a digital medium environment 100 in an example implementation that is operable to employ context-based prompt generation techniques described herein. The illustrated environment 100 includes a service provider system 102 and a computing device 104 that are communicatively coupled, one to another, via a network 106. Computing devices are configurable in a variety of ways.

A computing device, for instance, is configurable as a desktop computer, a laptop computer, a mobile device (e.g., assuming a handheld configuration such as a tablet or mobile phone), and so forth. Thus, a computing device ranges from full-resource devices with substantial memory and processor resources (e.g., personal computers and game consoles) to a low-resource device with limited memory and/or processing resources (e.g., mobile devices). Additionally, although a single computing device is shown and described in instances in the following discussion, a computing device is also representative of a plurality of different devices, such as multiple servers utilized by a business to perform operations "over the cloud" for the service provider system 102 and as further described in relation to FIG. 9.

The service provider system 102 includes a digital service manager module 108 implemented using hardware and software resources 110 (e.g., a processing device and computer-readable storage medium) to support one or more digital services 112. Digital services 112 are made available remotely via the network 106 to computing devices, e.g., computing device 104.

Digital services 112 are scalable through implementation by the hardware and software resources 110 and support a variety of functionalities, including accessibility, verification, real-time processing, analytics, load balancing, and so forth. Examples of digital services include a social media service, streaming service, digital content repository service, content collaboration service, and so on. Accordingly, in the illustrated example, a communication module 114 (e.g., browser, network-enabled application, and so on) is utilized by the computing device 104 to access one or more digital services 112 via the network 106. A result of processing using the digital services 112 is then returned to the computing device 104 via the network 106.

In the illustrated example, a UI selection 116 is used as a basis by the service provider system 102 to output generative digital content 118 using a generative artificial intelligence (AI) system, illustrated as generative AI system 120. The generative AI system 120 represents various functionalities that leverage machine learning to produce generative digital content 118. Although illustrated as implemented by the digital services 112 of the service provider system 102, the generative AI system 120 may also be implemented locally on the computing device 104, e.g., by the communication module 114.

The generative AI system 120 is configured to process prompts through a series of algorithms and neural networks to produce generative digital content 118. Conventional interfaces for AI systems involve users shifting between different contexts and manually formulating appropriate prompts for each system. The context switching and prompt creation process is often cognitively demanding, potentially leading to inefficiencies, errors in user interactions, or underutilization of available features.

Accordingly, to address these technical challenges, the generative AI system 120 employs a prompt generation module 122 that includes a machine-learning model 124 to generate a prompt 126 from the UI selection 116. The machine-learning model 124, for instance, is trained to construct a prompt 126 based on the UI selection 116 and additional context associated with the selected UI element, for which, the machine-learning model 124 is trained. The generative AI system then uses a generative machine-learning model 128 to provide the generative digital content 118 based on the prompt 126.

The generative machine-learning model 128 model is trained on training data having a vast dataset, learning patterns and structures within the training data. Generative machine-learning models are often trained using vast generalized training data. Accordingly, these generative machine-learning models rely heavily on the details provided in an input to achieve a result that differs from a generalized scenario. In practice, the details to be included in the prompt are limited to sophisticated users having specialized knowledge gained over a significant amount of time to determine what phrasing and aspects are central to achieving a desired result.

In contrast, given a UI selection 116 (e.g., highlighting, selecting, or marking of text, images, charts, forms, or other digital content or UI elements), the machine-learning model 124 utilizes trained knowledge to generate prompts 126 for the generative machine-learning model 128. The machine-learning model 124, once trained, enhances the UI selection 116 by incorporating context from the displayed digital content and the user's interaction history with the digital content as indicative of successful prompts in a corresponding task.

The prompt 126, as generated by the prompt generation module 122, is configurable to provide context to the UI selection 116 for processing by the generative machine-learning model 128 to achieve a desired result, e.g., generative digital content 118 as suitable for a particular task. Further discussion of these and other examples is included in the following section and shown in the corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in various ways. Thus, individual functionality, features, and concepts described in relation to different example environments, devices, components, figures, and procedures herein are usable in any suitable combinations and are not limited to the particular combinations represented by the enumerated examples in this description.

Example Context-Based Prompt Generation

The following discussion describes context-based prompt generation techniques that are implementable utilizing the described systems and devices. Aspects of each procedure are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions, thereby creating a special-purpose machine for carrying out an algorithm as illustrated by the flow diagram. As a result, the instructions are storable on a computer-readable storage medium that causes the hardware to perform the algorithm.

Figure 2:
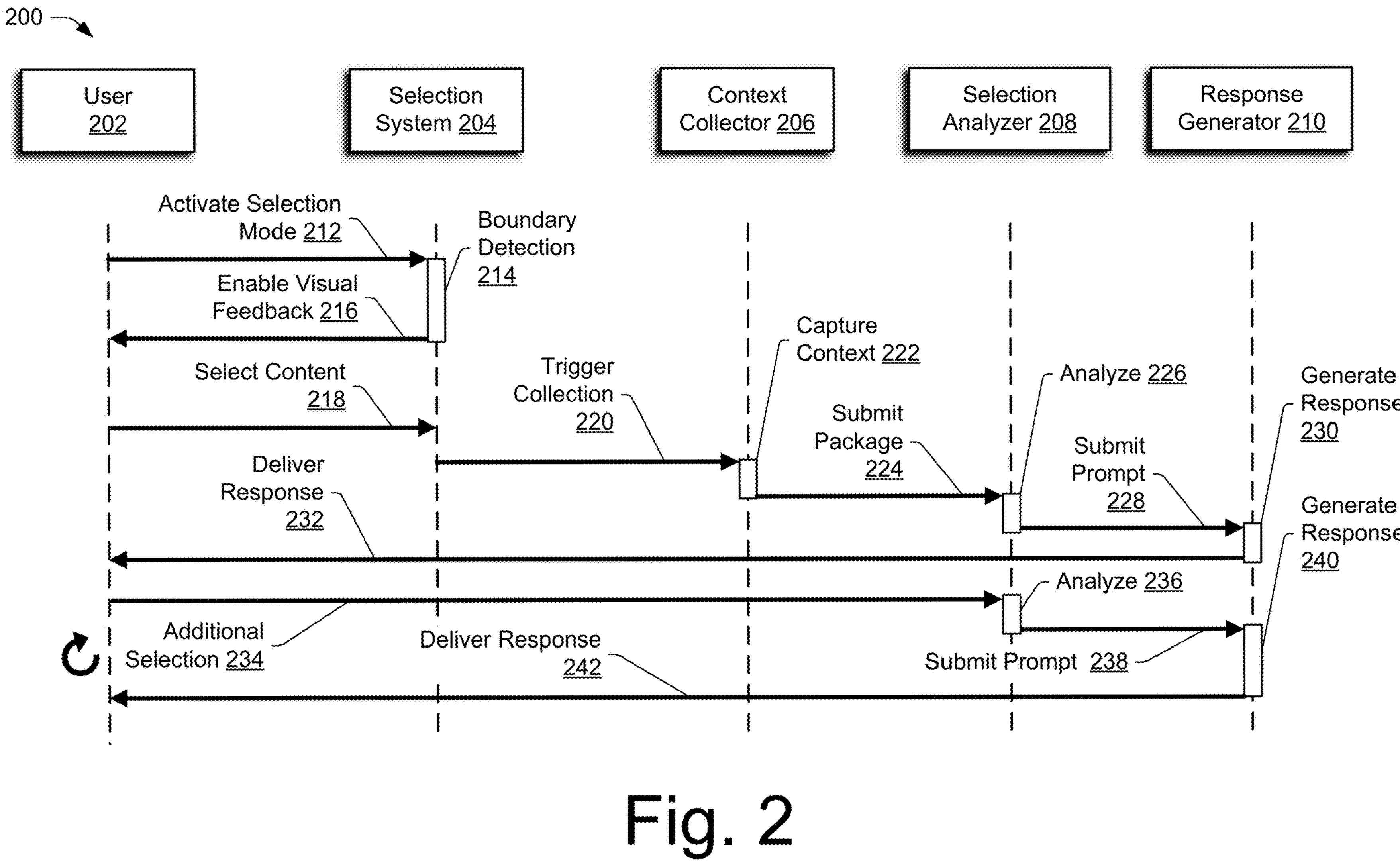
FIG. 2 illustrates an example flow diagram of a system for context-based prompt generation.

FIG. 2 illustrates an example flow diagram 200 of a system for context-based prompt generation. The flow diagram includes a user 202 that interacts with an AI assistant system, which includes a selection system 204, a context collector 206, a selection analyzer 208, and a response generator 210. These components function cooperatively to process user inputs, generate contextually relevant prompts, and provide appropriate responses.

Figure 3:
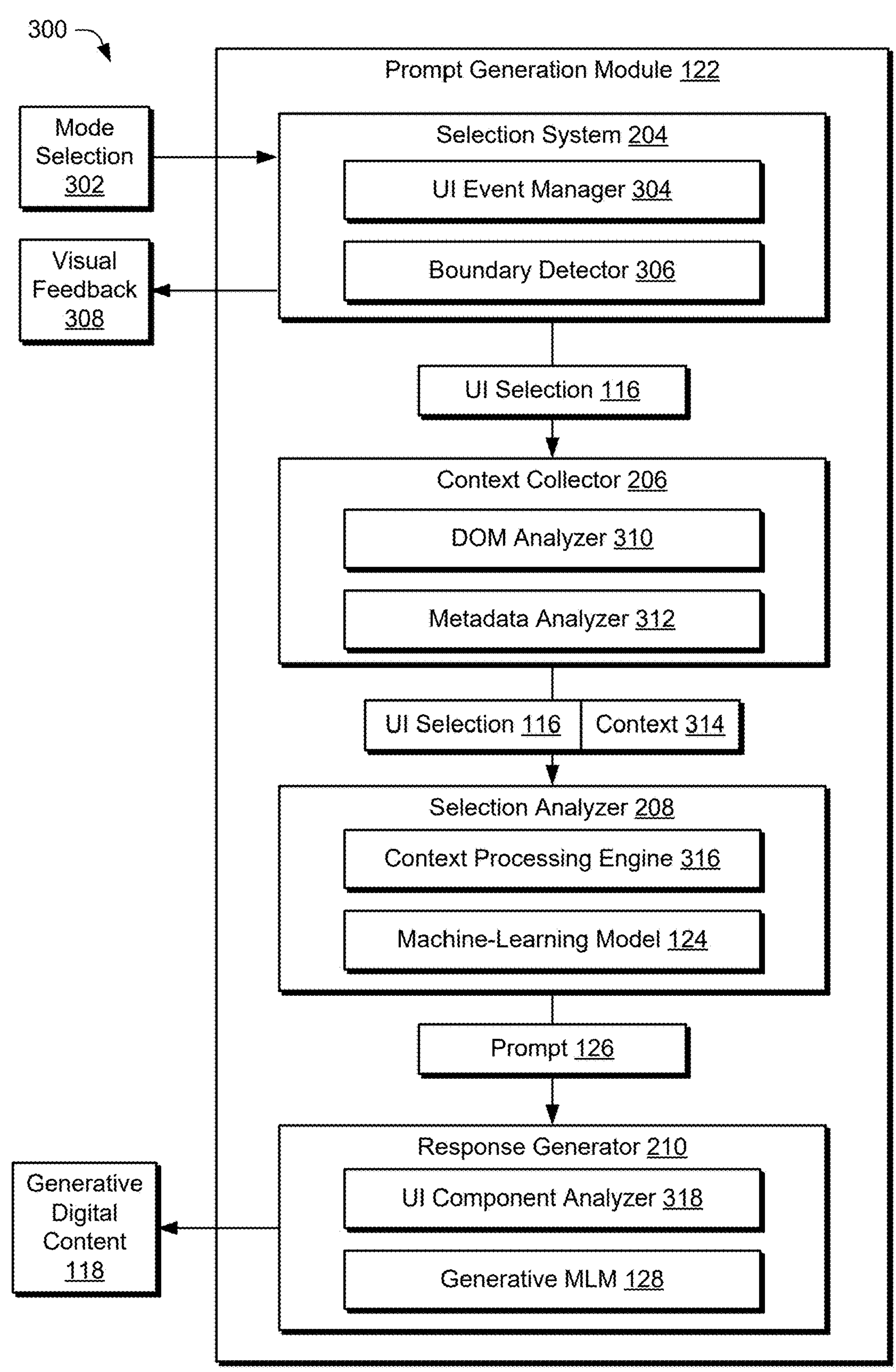
FIG. 3 illustrates an example system for context-based prompt generation that can execute a flow diagram illustrated in FIG. 2.

FIG. 3 illustrates an example system 300 for context-based prompt generation that can execute the flow diagram 200. The system 300 includes the selection system 204, the context collector 206, the selection analyzer 208, and the response generator 210 of FIG. 2. The flow diagram 200 and the system 300 are referred to interchangeably in the following paragraphs to illustrate example operations of the generative AI system 120, the prompt generation module 122, and the generative machine-learning model 128.

The selection system 204 includes a UI event manager 304 and a boundary detector 306 for receiving and processing user interface selections. The UI event manager 304 processes user interactions with the interface, capturing events such as clicks, drags, or hover actions. The UI event manager 304 also processes voice inputs, touch inputs, gestures, or other user inputs interacting with one or more UI elements of displayed digital content. The boundary detector 306 functions with the UI event manager 304 to determine the boundaries of elements within the user interface. The boundary detector 306 can utilize coordinate tracking to identify an element beneath a user's cursor or touch input through DOM intersection analysis. In one implementation, the selection system 204 uses a weighted scoring algorithm to evaluate potential element boundaries and identify selected UI elements. The algorithm considers factors including semantic HTML5 tags (e.g., <article>, <section>, <main>), common content patterns (e.g., blog posts, product listings, or comment threads), spatial proximity of related elements, and consistent styling patterns that indicate grouped content. The scoring system dynamically adjusts selection recommendations based on the aggregate of the different factors.

In one implementation, the selection system 204 includes a predictive selection mechanism. As the user moves a cursor, the selection system 204 identifies the immediate element and pre-calculates potential logical groupings. These calculations occur in real-time, allowing the selection system 204 to suggest expanded selection boundaries when detecting that the user interacts with part of a larger coherent content unit. For example, when hovering over a paragraph within an article, the system may suggest selecting the entire article while still preserving the option to select just the paragraph. In addition, the generative AI system 120 can prefetch relevant context and prepare generative AI analyses as the user moves the cursor over different elements.

The flow diagram 200 begins when the user 202 activates a selection mode (step 212) of the selection system 204. A mode selection 302 allows users to activate or deactivate the context-based prompt generation functionality. Upon activation of the mode selection 302, the selection system 204 initiates boundary detection 214 and enables visual feedback 308 (step 216) to indicate selectable UI elements to the user 202. Visual feedback 308 provides real-time indications to users about selectable elements and the current state of the selection process. The selection mode allows the user 202 to identify and interact with specific UI elements within the digital content displayed on the computing device 104 using a mouse, touch, gestures, voice, or other input controls.

In one implementation, the selection system 204 includes adaptive learning by monitoring selection patterns to improve prediction accuracy. When users frequently modify automatic selections to include or exclude certain elements, the selection system 204 adjusts its weighting algorithms to match observed user preferences better.

Once the user 202 selects content or a UI element (e.g., UI selection 116) (step 218), the context collector 206 is triggered to collect relevant information (step 220). This relevant information includes a screenshot or snapshot of the UI element selected by the user. The context collector 206 includes a DOM analyzer 310 and a metadata analyzer 312. The DOM analyzer 310 examines the structure of the web page or application interface, extracting information about the hierarchical relationships between elements. The DOM analyzer 310 can work concurrent with the boundary detector 306 to evaluate the contextual significance of the UI selection 116 within the structural hierarchy of the selected content. For example, the DOM analyzer 310 traverses the document object model of the displayed digital content or application interface, identifying parent-child relationships (e.g., between parent and child nodes), sibling elements, and nested structures. This analysis provides a comprehensive understanding of the layout and organization of the content within the UI selection 116. The DOM analyzer 310 also extracts relevant features from the UI selection 116, such as element types, attributes, and content, contributing to the formation of the prompt 126.

In one implementation, the DOM analyzer 310 uses HTML semantics to capture relevant markup data not specifically highlighted by the UI selection 116. For example, submit type input elements reference a related form with a "form" property. Input fields refer to their label with a "name" property. Similarly, input fields refer to a list of options with a "list" property. Meter and progress elements refer to their form with a "name" property. When such an element is highlighted, the DOM analyzer 310 searches the fields for references to external HTML content and captures such content as added context. Similarly, the DOM analyzer 310 can consider the semantic meaning of surrounding elements (e.g., article boundaries, content sections, and related components) and the spatial clustering of nearby elements that may be part of a logical group.

The metadata analyzer 312 collects additional data such as application state, user interaction history, temporal information, and device characteristics. For example, the metadata analyzer 312 processes this data to provide context beyond the visible content of the interface. The metadata analyzer 312 examines user session data, previous interactions with similar elements, and device-specific information influencing the user experience. The metadata analyzer 312 applies natural language processing techniques to analyze the extracted metadata, identifying patterns and relationships that inform the context and intent of the UI selection 116.

In one implementation, the context collector 206 uses a real-time DOM observation mechanism that updates its understanding of the page structure as content changes to ensure that selection capabilities remain accurate as the page content is updated through user interaction or other updates.

The context collector 206 captures or packages contextual information associated with the UI selection 116 (step 222). This context data ensures that the subsequent analysis and response generation are tailored to the specific user interaction and content environment. In addition, the context collector 206 ensures the system captures relevant contextual information when a user interaction occurs, optimizing resource usage and maintaining responsiveness.

The context collector 206 then submits the context information as a package (step 224) to the selection analyzer 208. The context collector 206 organizes and prepares the collected contextual data for analysis, which includes structuring the data in a format optimized for processing by the subsequent analysis components. The package ensures that relevant information, including the UI selection 116 and associated context 314, is appropriately encapsulated and ready for transmission to the selection analyzer 208.

The selection analyzer 208 analyzes the information gathered by the context collector 206 (step 226) to generate a prompt 126. The selection analyzer 208 includes a context processing engine 316 and the machine-learning model 124. The context processing engine 316 performs data normalization, relationship mapping, and priority determination on the collected contextual information.

This processed data is then fed into the machine-learning model 124, which analyzes the information to determine the context and intent of the user selection for prompt generation. In one implementation, the selection analyzer 208 includes a predictive selection mechanism that pre-calculates potential logical groupings as the user moves the cursor. This allows the system to suggest expanded selection boundaries when it detects that the user interacts with part of a larger coherent content unit.

The selection analyzer 208 utilizes the machine-learning model 124 to analyze the UI selection 116 and the associated context 314. This analysis involves extracting relevant features, applying natural language processing techniques, and determining the context and intent behind the user's selection. For example, if the UI selection includes an UI control element (e.g., a button or tool icon) or empty form element, the machine-learning model 124 can determine the user's intent as informative, seeking information about the control element and how to utilize this control element. In another example, if the UI selection includes digital content of a displayed multimedia item, the machine-learning model 124 can determine the user's intent as seeking an analysis of the selected content.

The selection analyzer 208 outputs a structured query (e.g., a prompt 126) that encapsulates the user's implicit request for information or assistance. The prompt 126 is designed to guide the generative AI system 120 in producing relevant generative digital content 118. The prompt 126 is generally in a format optimized for input into the generative machine-learning model 128. The selection analyzer 208 submits the prompt 126 to the response generator 210 (step 228).

The response generator 210 takes the prompt 126 from the selection analyzer 208 and outputs generative digital content 118. In other words, the response generator 210 generates a response (step 230). The response generator 210 includes a UI component analyzer 318 and the generative machine-learning model 128. The UI component analyzer 318 evaluates the selected interface elements to determine an appropriate format for the generative digital content 118. The UI component analyzer 318 performs context evaluation, format determination, and delivery method selection to ensure that the generated content is tailored to the specific context and requirements of the user's selection. For example, the UI component analyzer 318 examines the specific characteristics of the UI elements within the selection, such as input fields, buttons, or complex widgets, to understand the functionality and purpose of the selected elements. The UI component analyzer 318 extracts relevant features from the UI selection 116, focusing on the interactive aspects and potential user intentions associated with the selected components.

The response generator 210 employs the generative machine-learning model 128 to process the prompt and synthesize new digital content that aligns with the user's implicit request. The generated digital content is then delivered or presented to the user (step 232). The generative digital content 118 includes explanatory information related to the UI element, suggested actions or next steps, relevant data or statistics, visual representations or charts derived from the information in the UI element, or interactive elements allowing further exploration of related content. This generative digital content 118 includes text, images, or audio content.

In one implementation, the response generator 210 generates interactive user interfaces for the generative digital content 118 based on the UI selection 116 and the inferred user intent. For example, the response generator 210 creates custom booking interfaces when users select travel-related content. Personalized product pages are generated based on selected items or features. In another implementation, dynamic dashboards are built from data visualizations or workflow-specific tools based on user interactions. These interfaces are dynamically generated based on the selected content, user needs, or available functionality.

The flow diagram 200 also illustrates the possibility of additional user interactions after the initial AI assistant response to the UI selection 116. After the initial response is delivered to the user 202, the user 202 can make an additional selection (step 234). The additional selection triggers another cycle of analysis (step 236), prompt submission (step 238), response generation (step 240), and response delivery (step 242), allowing for a continuous and iterative interaction between the user 202 and the AI system. Each subsequent interaction builds upon the context of previous selections and responses, creating a more refined and personalized experience. The additional selection includes interactions with the generated response or additional UI elements in the opened digital content. The additional user interactions can include multiple additional selections 234, which is illustrated by the circular arrow in FIG. 2.

Flow diagram 200 demonstrates how the context-based prompt generation system transforms a UI selection 116 into a rich, interactive AI analysis. By capturing contextual information and leveraging the generative AI system 120, the process provides users with valuable insights and opportunities for deeper exploration without formulating explicit queries. This seamless integration of AI assistance within the user's current context eliminates the need for users to switch between different interfaces or manually formulate complex prompts.

Example Training for Context-Based Prompt Generation

Figure 4:
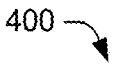
FIG. 4 illustrates a training system for training the machine-learning module of the prompt generation module of FIG. 1 in greater detail.
Figure 4:
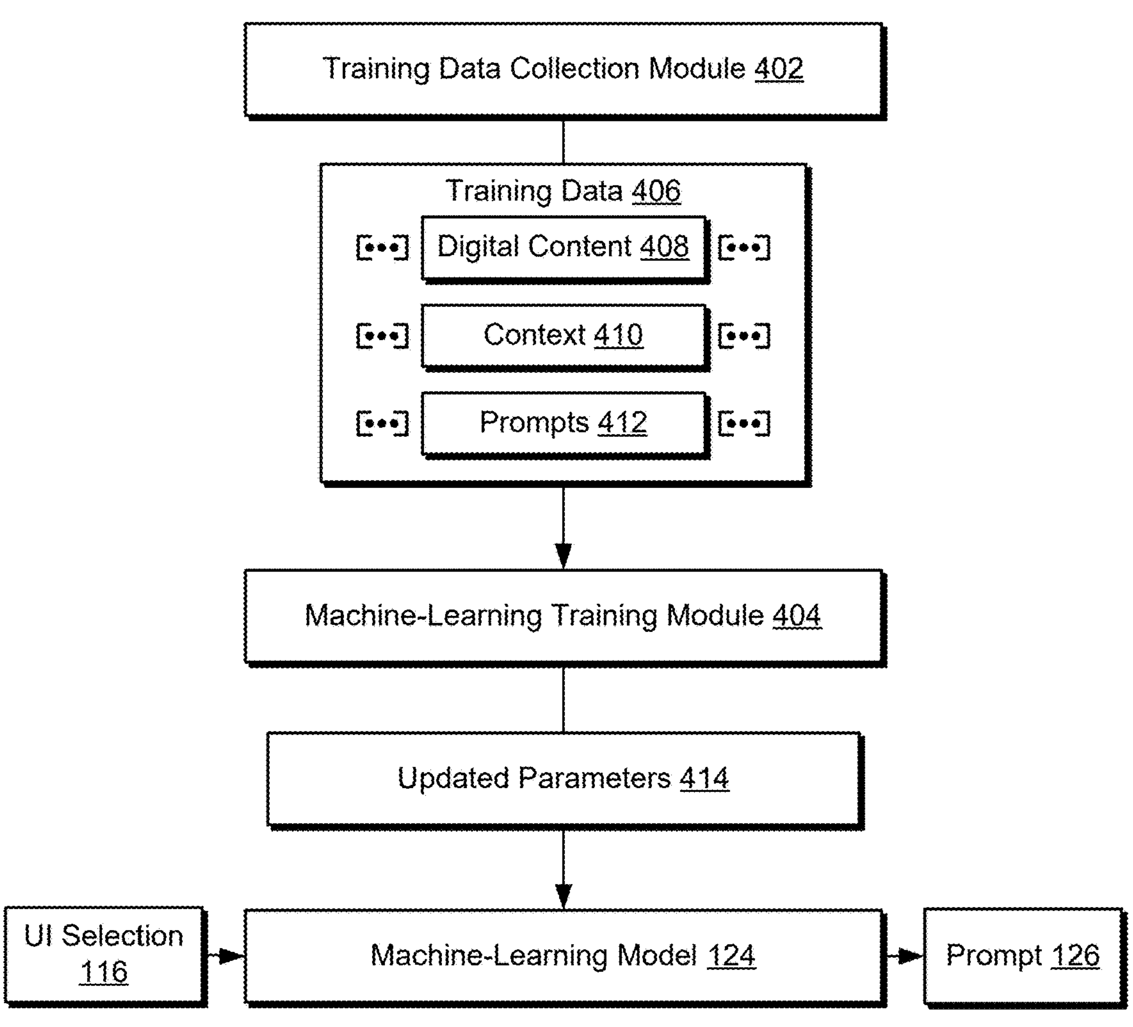

FIG. 4 illustrates a training system 400 for training the machine-learning model 124 of the prompt generation module 122 of FIG. 1 in greater detail. The training system 400 includes a training data collection module 402 that gathers training data 406 for training the machine-learning model 124. The training data 406 includes sets of digital content 408, context 410, and prompts 412 that resulted in generative AI responses that received explicit or implicit user feedback. In at least one implementation, the training data 406 includes digital content 408, context 410, and prompts 412 that did not result in positive generative AI responses.

The training data collection module 402 is operatively connected to a machine-learning training module 404, which processes the collected training data 406. The machine-learning training module 404 utilizes various algorithms and techniques to analyze the training data 406 and improve the performance of the machine-learning model 124 in generating contextually relevant prompts.

The machine-learning training module 404 processes the collected data and produces updated parameters 414 for the machine-learning model 124. The updated parameters 414 are uploaded to the machine-learning model 124 to improve its generation of prompts 126 from UI selections 116. This process allows the machine-learning model 124 to continuously refine and optimize context-based prompt generation based on user interactions and feedback.

The training system 400 incorporates a feedback loop to enhance the performance of the machine-learning model 124. After the generative digital content 118 is presented to the user, the system analyzes user feedback on the presented content, which includes express and implicit feedback. For example, user engagement with generated AI responses indicates a positive review of the generated prompt. Similarly, refinement or additional queries inform the training data collection module 402 of additional training data 406. User disengagement or lack of interaction with generated responses provides implicit negative feedback for the training data collection module 402. The feedback analysis provides insights into the effectiveness and relevance of the generated prompts and the resulting content.

Based on the analyzed user feedback, the machine-learning training module 404 generates updated parameters 414 of the machine-learning model 124. These adjustments modify the parameters, weights, or structure of the machine-learning model 124 to improve its performance in generating prompts. The adjusted machine-learning model 124 is then stored for subsequent prompt generation.

In one or more implementations, the training data collection module 402 periodically updates the training data 406 with new examples of successful and/or unsuccessful prompts 412. The machine-learning training module 404 then retrains the machine-learning model 124 using this updated training data 406, potentially using updated patterns or relationships to improve prompt generation.

Figure 5:
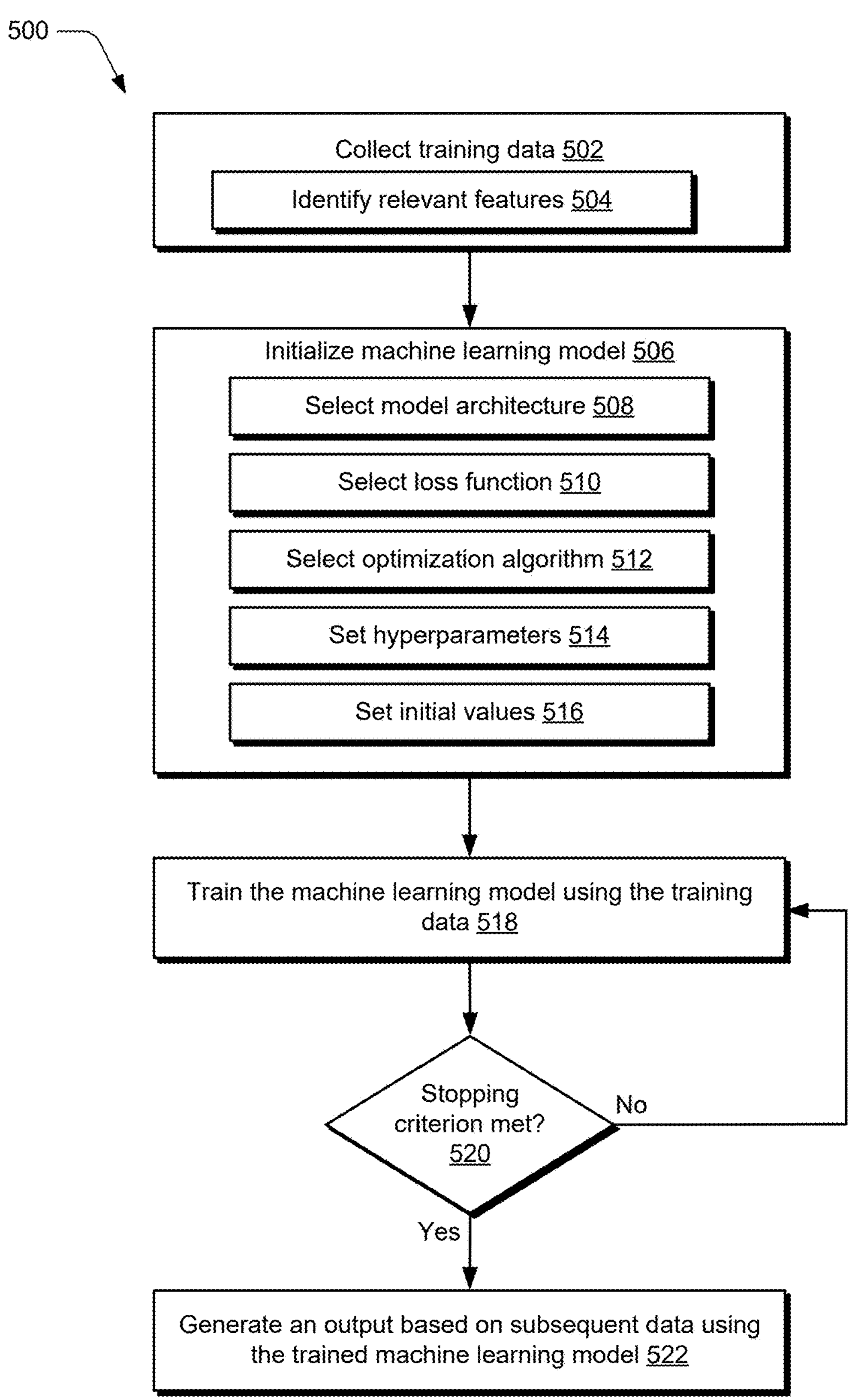
FIG. 5 is a flow diagram depicting an algorithm as a step-by-step procedure n an example implementation of operations performable for training a machine-learning model.

FIG. 5 is a flow diagram depicting an algorithm as a step-by-step procedure 500 in an example implementation of operations performable for training a machine-learning model. In some embodiments, the procedure 500 describes an operation of the machine-learning training module 404 described for configuring the machine-learning model 124 as described with reference to FIG. 4. The procedure 500 provides one or more examples of generating training data, use of the training data to train a machine-learning model, and use of the trained machine-learning model to perform a task.

To begin in this example, a machine-learning system collects training data (block 502) that is to be used as a basis to train a machine-learning model, i.e., which defines what is being modeled. The training data is collectable by the machine-learning system from a variety of sources. Examples of training data sources include public datasets, service provider system platforms that expose application programming interfaces (e.g., social media platforms), user data collection systems (e.g., digital surveys and online crowdsourcing systems), and so forth. Training data collection may also include data augmentation and synthetic data generation techniques to expand and diversify available training data, balancing techniques to balance a number of positive and negative examples, and so forth.

The machine-learning system is also configurable to identify features that are relevant (block 504) to a type of task, for which the machine-learning model is to be trained. Task examples include classification, natural language processing, generative artificial intelligence, recommendation engines, reinforcement learning, clustering, and so forth. To do so, the machine-learning system collects the training data based on the identified features and/or filters the training data based on the identified features after collection. The training data is then utilized to train a machine-learning model.

In order to train the machine-learning model in the illustrated example, the machine-learning model is first initialized (block 506). Initialization of the machine-learning model includes selecting a model architecture (block 508) to be trained. Examples of model architectures include neural networks, convolutional neural networks (CNNs), long short-term memory (LSTM) neural networks, generative adversarial networks (GANs), decision trees, support vector machines, linear regression, logistic regression, Bayesian networks, random forest learning, dimensionality reduction algorithms, boosting algorithms, deep learning neural networks, etc.

A loss function is also selected (block 510). The loss function is utilized to measure a difference between an output of the machine-learning model (i.e., predictions) and target values (e.g., as expressed by the training data) to be used to train the machine-learning model. Additionally, an optimization algorithm is selected (block 512) that is to be used in conjunction with the loss function to optimize parameters of the machine-learning model during training, examples of which include gradient descent, stochastic gradient descent (SGD), and so forth.

Initialization of the machine-learning model further includes setting initial values of the machine-learning model (block 514) examples of which includes initializing weights and biases of nodes to improve efficiency in training and computational resources consumption as part of training. Hyperparameters are also set (block 516) that are used to control training of the machine learning model, examples of which include regularization parameters, model parameters (e.g., a number of layers in a neural network), learning rate, batch sizes selected from the training data, and so on. The hyperparameters are set using a variety of techniques, including use of a randomization technique, through use of heuristics learned from other training scenarios, and so forth.

The machine-learning model is then trained using the training data (block 518) by the machine-learning system. A machine-learning model refers to a computer representation that can be tuned (e.g., trained and retrained) based on inputs of the training data to approximate unknown functions. In particular, the term machine-learning model can include a model that utilizes algorithms (e.g., using the model architectures described above) to learn from, and make predictions on, known data by analyzing training data to learn and relearn to generate outputs that reflect patterns and attributes expressed by the training data.

Examples of training types include supervised learning that employs labeled data, unsupervised learning that involves finding an underlying structures or patterns within the training data, reinforcement learning based on optimization functions (e.g., rewards and/or penalties), use of nodes as part of "deep learning," and so forth. The machine-learning model, for instance, is configurable as including a plurality of nodes that collectively form a plurality of layers. The layers, for instance, are configurable to include an input layer, an output layer, and one or more hidden layers. Calculations are performed by the nodes within the layers through the hidden states through a system of weighted connections that are "learned" during training, e.g., through use of the selected loss function and backpropagation to optimize performance of the machine-learning model to perform an associated task.

As part of training the machine-learning model, a determination is made as to whether a stopping criterion is met (decision block 520), i.e., which is used to validate the machine-learning model. The stopping criterion is usable to reduce overfitting of the machine-learning model, reduce computational resource consumption, and promote an ability of the machine-learning model to address previously unseen data, i.e., that is not included specifically as an example in the training data. Examples of a stopping criterion include but are not limited to a predefined number of epochs, validation loss stabilization, achievement of a performance improvement threshold, whether a threshold level of accuracy has been met, or based on performance metrics such as precision and recall. If the stopping criterion has not been met ("no" from decision block 520), the procedure 500 continues training of the machine-learning model using the training data (block 518) in this example.

If the stopping criterion is met ("yes" from decision block 520), the trained machine-learning model is then utilized to generate an output based on subsequent data (block 522). The trained machine-learning model, for instance, is trained to perform a task as described above and therefore once trained is configured to perform that task based on subsequent data received as an input and processed by the machine-learning model.

Example Procedure for Context-Based Prompt Generation

The following discussion describes context-based prompt generation techniques that are implementable utilizing the described systems and devices. Aspects of each of the procedures are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm.

FIGS. 6*a* and 6*b* illustrate an example 600 of context-based prompt generation and digital content presentation. The example 600 demonstrates the process of receiving a user interface (UI) selection, capturing contextual information, generating a prompt, and presenting digital content based on the generated prompt within an application that includes the described AI assistant.

FIG. 6*a* depicts a chart 602 displayed in a user interface. In example 600, the chart 602 represents audience size changes over a 90-day period. The user makes a UI selection 604, indicating that a user has selected or highlighted the chart 602. Upon receiving the UI selection 604, the system captures contextual information associated with the chart 602. This contextual information includes data about the chart 602, such as its type, the data it represents, and its position within the user interface.

The captured contextual information, along with the UI selection 604, is used by the prompt generation module 122 to generate, in an AI assistant window 606, a displayed prompt 608. The displayed prompt 608 is formulated to request analysis and insights about the selected chart 602. As illustrated in FIGS. 6*a* and 6*b*, the displayed prompt 608 includes a screenshot of the UI selection 604 and a natural language interpretation of the user's intent. Here, the display prompt 608 includes the question "What can you tell me about this?" along with the screenshot.

FIG. 6*b* illustrates a response 610 generated by the generative AI system 120 based on the prompt 608. The response 610 includes several components that provide comprehensive information and analysis related to the selected chart 602.

The response 610 includes a summary 612, insights 614, selectable prompts 616, and a chat interface 618. The summary 612 provides an overview of the information in chart 602, explaining that the graph depicts trends in audience size changes over 90 days and concisely describing its content. Insights 614 provide explanatory information related to the UI element. For example 600, the insights 614 highlights key observations about the audience size patterns and trends. In one implementation, insights 614 offer relevant data and statistics associated with the UI selection 604, such as noting the cyclical pattern in audience size and identifying significant spikes in the graph.

The selectable prompts 616 suggest actions or next steps based on the UI selection 604, encouraging further exploration. For example, one of the selectable prompts 616 suggests overlaying additional data sources to identify potential drivers behind the observed fluctuations.

In some implementations, the UI selection and associated information may be shared with other entities or systems for various purposes. For example, the UI selection 604, contextual information, a screenshot of the chart 602, and the generated response 610 may be packaged together and transmitted to a technical support representative to assist with troubleshooting or provide additional insights (e.g., to streamline and improve customer support operations or collaborative working scenarios). This shared package may also be formatted as a service ticket and submitted to an automated support system for processing and routing to appropriate personnel. Additionally, the system may allow users to export this information as a file or store it locally for later analysis. The exported data may include the original UI selection, captured context, visual representation of the selected element, and the AI-generated response, providing a comprehensive record of the interaction. This sharing capability may enhance collaboration, enable more effective support processes, and allow for offline review and analysis of the AI-assisted interactions.

The chat interface 618 provides an interactive element allowing further exploration of content related to the UI selection 604. Users can input follow-up questions or requests for additional analysis, enabling continuous interaction with the generative AI system.

FIG. 7 illustrates an example 700 of a webpage interaction utilizing the described context-based prompt generation techniques.

Example 700 includes a webpage 702 with a user interface displaying various data and query results, including a graph. Once the user enables a web browser extension for the generative AI system 120, the user can access content analysis with UI elements displayed, even if the webpage 702 is not provided by the generative AI system 120.

In example 700, the user selects UI selection 704. The generative AI system provides visual feedback indicating the portion of webpage 702 that is being included in the prompt request. The UI selection 704 acts as the control point for users to initiate and customize their interaction with the system.

In response to the UI selection 704, a UI window 706 opens over or in line with webpage 702. The UI window 706 displays the generated prompt 708, which includes a reproduction of the UI selection 704 and a natural language representation of the prompt provided to the generative machine-learning model 128. The generated prompt 708 is generated by the prompt generation module 122 and is tailored to elicit digital content relevant to the UI selection 704.

The UI window 706 also includes the generated response 710, with selectable prompts for additional AI analysis of the UI selection 704. The UI window is dynamically updated to show analysis results, generated content, and/or system responses to user queries. When a user selects other UI elements, the generative AI system 120 updates the UI window 706. This dynamically generated UI window 706 includes interactive elements tailored to the selected content, such as data visualization tools, editing capabilities, or context-specific controls.

In accordance with the described techniques, the selection mode initiated through the UI selection 704 is not limited to direct user input. The generative AI system 120 allows the selection mode to be initiated by other entities, such as an AI assistant or a customer support agent. For example, during a support session, a customer support agent uses the system to guide a user through troubleshooting steps by remotely initiating selections and prompts on the user's webpage 702. In another scenario, the user utilizes the described system to collect additional context to submit with a support ticket.

As illustrated in example 700, the generative AI system 120 extends beyond the boundaries or confines of a single application, offering a versatile and comprehensive solution for content analysis and interaction across diverse digital platforms. By implementing browser extensions, the generative AI system 120 seamlessly integrates with web-based applications, allowing users to analyze and interact with online content directly within a preferred browser environment. Desktop applications provide a standalone interface for users to leverage the generative AI system 120 on locally stored files and documents, enhancing productivity in offline scenarios. System-level integrations enable the described techniques of context-based content analysis and interaction features to be accessible at the operating system level, providing a consistent experience across each application and file type available on the system across in diverse digital environments.

This multi-platform approach ensures that users can access the capabilities of the generative AI system 120 across different digital environments. For example, a user can analyze a chart in a web-based analytics tool using a browser extension, then switch to examining a locally stored document using a desktop application and finally interact with system-wide content using the system-level integration. This cross-platform accessibility of the system provides new possibilities for content analysis and assistance in various professional and personal contexts. Data analysts can extract insights from multiple sources, content creators can receive AI-powered suggestions across different authoring tools, and researchers can seamlessly integrate AI assistance into their diverse workflow of applications and data sources. The described universal approach to content analysis and interaction breaks down barriers between different applications and platforms to provide a cohesive and intelligent assistance layer across all digital interactions.

In one implementation, the generative AI system 120 incorporates a proactive intelligence layer to enhance user interaction. This layer predicts likely subsequent selections based on user behavior patterns and the current context displayed on the webpage 702. The generative AI system 120 pre-fetches relevant contextual information and prepares potential prompts and/or responses by anticipating user needs to minimize response latency and provide a richer user experience.

FIG. 8 is a flow diagram depicting an algorithm as a step-by-step procedure 800 in an example implementation of operations performable for context-based prompt generation.

To begin, a selection of a UI element of first digital content is received (block 802). By way of example, the selection occurs through user interaction with a graphical user interface displayed on the computing device 104. A user highlights text, selects an image, or interacts with a chart or form element within an application, web page, or other digital content.

Contextual information associated with the selection is captured (block 804). By way of example, the context collector 206 analyzes the DOM structure related to the UI selection 116 and the surrounding digital content. This analysis extracts hierarchical relationships between UI elements, identifies attributes and properties of the selected UI element and its parent elements, and determines the position and layout of the selected UI element relative to other elements on the page. Additionally, the context collector 206 gathers metadata associated with the UI selection 116, which includes user interaction history, temporal data, device characteristics, and environmental data collected at the time of the selection.

A prompt is generated based on the selection and the contextual information using a first machine-learning model (block 806). For example, the prompt generation module 122 utilizes the machine-learning model 124 to process the captured information. The prompt generation module 122 extracts relevant features from the UI selection 116 and contextual information, applies natural language processing techniques to analyze these features, determines the context and intent of the UI selection 116, and formulates a structured query. The resulting prompt 126 includes parameters designed to guide the generative AI in producing digital content relevant to the UI selection 116.

Second digital content is generated based on the prompt using generative AI, which is implemented using one or more second machine-learning models (block 808). For example, the generative AI system 120 employs the generative machine-learning model 128 to process the prompt 126. The generated content includes explanatory information related to the UI selection 116, suggested actions or next steps, relevant data or statistics, visual representations or charts derived from the information in the UI selection 116, or interactive or dynamic elements allowing further exploration of related content.

In one implementation, the generative AI system 120 identifies the domain associated with the UI selection 116 and contextual information, selects a domain-specific generative AI model based on the identified domain, and utilizes the selected model to produce the second digital content. For example, the generative AI system 120 analyzes different types of content (in the UI selection 116) differently. For forms, the generative AI system 120 examines field types, labels, and input validation rules. Charts are processed by extracting data points, axis labels, and trend lines. Text analysis involves natural language processing to determine context and meaning. For buttons and interactive elements, the system considers their placement, labels, and associated actions. This multi-faceted approach enables the system to generate contextually appropriate responses tailored to each content type.

The second digital content is then displayed in a user interface (block 810). For example, the computing device 104 renders the generated content on the device screen or prepares it for output through another appropriate medium. This presentation integrates seamlessly with the existing user interface, providing immediate, contextually relevant information or assistance based on the user's selection.

The generative AI system 120 supports continuous interaction and refinement. After presenting the generated digital content, the generative AI system 120 receives subsequent user input related to the displayed content. The input triggers an updated prompt generation based on the new and previous prompts. The updated prompt feeds into the generative AI system 120, producing updated second digital content.

Example System and Device

FIG. 9 illustrates an example system generally at 900 that includes an example computing device 902 that is representative of one or more computing systems and/or devices that implement the various techniques described herein. This is illustrated through inclusion of the generative AI system 120. The computing device 902 is configurable, for example, as a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that is configurable as processors, functional blocks, and so forth. This includes implementation in hardware as an application specific integrated circuit or other logic device formed using one or more semiconductors. The hardware elements 910 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 906 is illustrated as including memory/storage 912. The memory/storage 912 represents memory/storage capacity associated with one or more computer-readable media. The memory/storage 912 includes volatile media (such as random access memory (RAM)) and/or nonvolatile media (such as read only memory (ROM), Flash memory, optical disks, magnetic disks, and so forth). The memory/storage 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," "component," and "system" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 902. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employed to implement various techniques described herein. Accordingly, software, hardware, or executable modules are implemented as one or more instructions and/or logic embodied on some form of computer-readable storage media and/or by one or more hardware elements 910. The computing device 902 is configured to implement particular instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing system 904. The instructions and/or functions are executable/operable by one or more articles of manufacture (for example, one or more computing devices 902 and/or processing systems 904) to implement techniques, modules, and examples described herein.

The techniques described herein are supported by various configurations of the computing device 902 and are not limited to the specific examples of the techniques described herein. This functionality is also implementable all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 include applications and/or data that can be utilized while computer processing is executed on servers that are remote from the computing device 902. Resources 918 can also include services provided over the Internet and/or through a subscriber network, such as a cellular or Wi-Fi network.

The platform 916 abstracts resources and functions to connect the computing device 902 with other computing devices. The platform 916 also serves to abstract scaling of resources to provide a corresponding level of scale to encountered demand for the resources 918 that are implemented via the platform 916. Accordingly, in an interconnected device embodiment, implementation of functionality described herein is distributable throughout the system 900. For example, the functionality is implementable in part on the computing device 902 as well as via the platform 916 that abstracts the functionality of the cloud 914.

What is claimed is:

1. A method comprising:

receiving, by a processing device, a selection of a UI element of first digital content;

capturing, by the processing device, contextual information associated with the selection;

in response to receiving the selection, generating, using a first machine-learning model, a prompt based on the selection and the contextual information, the selection triggering the generating of the prompt before receiving a subsequent user input;

generating, using generative artificial intelligence (AI) implemented using one or more second machine-learning models based on the prompt, second digital content; and presenting, by the processing device, the second digital content for display in a user interface.

2. The method of claim 1, wherein:

the selection of the UI element comprises highlighting, selecting, or marking of text, images, charts, forms, or other UI elements of the first digital content; and the second digital content comprises text, images, or audio content aligned with a context of the selection.

3. The method of claim 1, wherein capturing the contextual information comprises analyzing a document object model (DOM) structure associated with the selection and the first digital content.

4. The method of claim 3, wherein capturing the contextual information further comprises collecting metadata associated with the selection.

5. The method of claim 1, wherein generating the prompt comprises:

extracting one or more features from the selection or the contextual information;

applying one or more natural language processing techniques to analyze the one or more features;

determining a context and an intent of the selection based on the one or more features;

formulating a structured query based on the context and the intent; and outputting the prompt based on the structured query, wherein the prompt includes parameters for guiding the generative AI in producing the second digital content.

6. The method of claim 5, wherein the first machine-learning model is trained using a dataset comprising examples of digital content that demonstrated user-approved performance metrics.

7. The method of claim 5, wherein generating the prompt further comprises:

capturing a screenshot of the selection of the UI element, the screenshot being included in the prompt to the generative AI.

8. The method of claim 7, wherein the selection of the UI element, the screenshot, the contextual information associated with the selection, and the second digital content are transmitted to a chat interface, a computer system remote from the processing device, a remote third party, or a memory associated with the processing device as a storage file.

9. The method of claim 1, further comprising:

receiving the subsequent user input related to the second digital content;

generating an updated prompt based on the subsequent user input and the prompt; providing the updated prompt to the generative AI; and presenting updated second digital content for display in the user interface.

10. The method of claim 1, wherein receiving the selection of the UI element comprises:

using, a weighted scoring algorithm, to evaluate potential boundaries of the UI element, the weighted scoring algorithm considering at least two of semantic HTML5 tags, content patterns, spatial proximity of other UI elements, or styling patterns of the other UI elements.

11. The method of claim 1, wherein the second digital content includes at least one of:

explanatory information related to the UI element;

suggested actions or next steps based on the UI element;

relevant data or statistics associated with the UI element;

visual representations or charts derived from information in the UI element; or interactive elements allowing further exploration of content related to the UI element.

12. A system comprising:

memory; and a hardware processing device coupled to the memory, the hardware processing device configured to perform operations comprising:

detecting activation of a selection mode;

receiving a user interface (UI) selection of a UI element while in the selection mode;

capturing contextual information associated with the UI selection;

in response to receiving the UI selection, generating, using a machine-learning model, a prompt based on the UI selection and the contextual information, the UI selection triggering the generating of the prompt before receiving a subsequent user input;

providing the prompt to a generative machine-learning model; and outputting generative digital content produced by the generative machine-learning model in response to the prompt.

13. The system of claim 12, wherein the hardware processing device performs additional operations comprising:

providing, while in the selection mode, visual feedback indicating the UI element is selectable; and in response to providing the visual feedback that the UI element is selectable and before receiving the UI selection, generating a preliminary prompt using the machine-learning model and generating preliminary generative digital content by the generative machine-learning model based on the preliminary prompt.

14. The system of claim 12, wherein:

the UI element and the generative machine-learning model are provided as part of a single application; or the UI element is displayed as part of a first application and the selection mode and the generative machine-learning model are provided as part of a second application.

15. The system of claim 12, wherein capturing the contextual information comprises:

analyzing a document object model (DOM) structure associated with the UI selection;

extracting hierarchical relationships between UI elements from the DOM structure;

identifying attributes and properties of the selected UI element and its parent elements; and determining a position and a layout of the selected UI element relative to other elements on a page.

16. The system of claim 15, wherein capturing the contextual information further comprises collecting metadata associated with the UI selection and user information, the user information including at least one of a role or a position of a user, permissions associated with the user, or user history.

17. One or more non-transitory computer-readable storage media storing instructions that, when executed by a processor, cause the processor to:

receive a user interface (UI) selection of a UI element;

capture contextual information associated with the UI selection;

in response to receiving the UI selection, generate, using a machine-learning model, a prompt based on the UI selection and the captured contextual information, the UI selection triggering generation of the prompt before receiving a subsequent user input;

provide the generated prompt to a generative machine-learning model; and output generative digital content produced by the generative machine-learning model in response to the generated prompt.

18. The one or more non-transitory computer-readable storage media of claim 17, wherein the contextual information includes at least one of:

user interaction history with the UI element;

temporal data associated with the UI selection;

device characteristics of a computing device used for the UI selection; or environmental data collected at a time of the UI selection.

19. The one or more non-transitory computer-readable storage media of claim 17 storing additional instructions that, when executed by the processor, cause the processor to:

analyze user feedback on the generative digital content;

adjust the machine-learning model based on the user feedback; and store the adjusted machine-learning model for use in subsequent prompt generation.

20. The one or more non-transitory computer-readable storage media of claim 17, wherein the instructions, when executed by the processor, cause the processor, in generating the generative digital content, to:

identify a domain associated with the UI selection and the contextual information;

select a domain-specific generative AI model based on the identified domain; and utilize the selected domain-specific generative AI model to produce the generative digital content.

* * * * *